United States Patent [19]

Dupuis et al.

[11] Patent Number: 5,424,390

[45] Date of Patent: Jun. 13, 1995

[54] PROCESSES FOR MANUFACTURE OF SULFONATED MELAMINE-FORMALDEHYDE RESINS

[75] Inventors: Mario Dupuis, Longueil; Ioan Spiratos, Laprairie, both of Canada

[73] Assignee: Handy Chemicals Limited, LaPrairie, Canada

[21] Appl. No.: 63,008

[22] Filed: May 17, 1993

[51] Int. Cl.6 ............................................. C08G 12/30
[52] U.S. Cl. ................... 528/254; 524/528; 524/843; 528/255; 528/388
[58] Field of Search ............... 528/254, 255, 388; 524/598, 843

[56] References Cited

U.S. PATENT DOCUMENTS

| | | | |
|---|---|---|---|
| 3,661,829 | 5/1972 | Aignesberger et al. | 260/29.4 |
| 3,870,671 | 3/1975 | Aignesberger et al. | 260/29.4 |
| 3,941,734 | 3/1976 | Aignesberger et al. | 260/29.4 |
| 3,985,696 | 10/1976 | Aignesberger et al. | |
| 4,126,470 | 11/1978 | Braun et al. | 106/95 |
| 4,272,430 | 6/1981 | Pieh et al. | 260/39 |
| 4,367,294 | 1/1983 | Hahn et al. | 521/158 |
| 4,403,993 | 9/1983 | Lach et al. | 8/94.24 |
| 4,430,494 | 2/1984 | Honel et al. | 528/254 |
| 4,444,945 | 4/1984 | Sheldrick | 524/843 |
| 4,677,159 | 6/1987 | Lahalih et al. | 524/843 |

FOREIGN PATENT DOCUMENTS 4821579 8/1981 Australia .

OTHER PUBLICATIONS

Encyclopedia of Chemical Technology, third edition, vol. 2, Kirk–Othmer–pp. 454, 458–459, 468.

*Primary Examiner*—Paul R. Michl
*Assistant Examiner*—Edward Cain
*Attorney, Agent, or Firm*—Cooper & Dunham

[57] ABSTRACT

A process of producing an aqueous solution of a sulfonated melamine-formaldehyde resin. The process comprises condensing melamine and formaldehyde or a precursor of formaldehyde (e.g. paraformaldehyde) in an aqueous mixture having a pH in the range of 8–10 to form a reaction mixture containing a condensation product of melamine and formaldehyde. The condensation product is then reacted in an aqueous mixture having a pH of 8–10, preferably 8–9, with a sulfonating agent to produce a mixture containing a sulfonated condensation product. Finally, polymerizing the said sulfonated condensation product in an aqueous mixture having a pH of 5–7 to form a resin solution. In the process, at least one of the sulfonation step and the polymerizing step is carried out under superatmospheric pressure (generally 5 to 70 p.s.i.) and at an elevated temperature of, in the case of the sulfonating step, 100°–130° C. for a time of 1 to 5 hours or of, in the case of the polymerizing step, 105–150° C. for a time of 15 minutes to three hours. Modifications of the basic process involve carrying out the sulfonation of the formaldehyde before the condensation of the melamine and formaldehyde or reacting all of the melamine, formaldehyde or precursor and the sulfonating agent all together under superatmospheric pressure. The resulting aqueous solution, or the dried resin extracted therefrom, has low salt content and is suitable as a superplasticizer for concrete mixes.

15 Claims, 1 Drawing Sheet

PROCESSES FOR MANUFACTURE OF SULFONATED MELAMINE-FORMALDEHYDE RESINS

BACKGROUND OF THE INVENTION

This invention relates to water-soluble sulfonated melamine-formaldehyde resins which may be used as superplasticizers for concrete and for other purposes. More particularly, the invention relates to processes for producing such resins.

Concrete superplasticizers are products that, when added to concrete mixes, provide increased fluidity without the need for additions of extra water that tend to prolong curing times and may weaken the strength of the resulting concrete. The increased fluidity translates into higher slumping values, better adhesion of the concrete to reinforcing bars and better filling of void spaces in forms and the like. Products of this type are also sometimes referred to as "fluidifiers for fresh concrete" and "high range water reducers".

Water-soluble sulfonated melamine-formaldehyde resins have been found suitable for this purpose, e.g. as described in U.S. Pat. No. 4,272,430 to Pieh et. al. issued on Jun. 9, 1981. However, conventional methods of producing such resins have generally involved a condensation step carried out at a low (highly acidic) pH value in order to produce a high molecular weight product. Unfortunately, as a result of this, the final resin product contains a large percentage, e.g. 10% or more, of inorganic salt (usually sodium sulphate) arising from the required neutralization of the acidic reaction mixture after the condensation step has taken place. The presence of such salt potentially can adversely affect the physical properties of the concrete when the resin is used as a superplasticizer and may reduce the desired fluidizing properties of the additive, but is difficult and expensive to remove the salt from the liquid resin product by methods such as precipitation filtration or dialysis.

This problem has been addressed in U.S. Pat. No. 4,444,945 to Sheldrick issued on Apr. 24, 1984 and a process is disclosed that avoids a final condensation step at low pH. According to the patent disclosure, melamine, formaldehyde and bisulfite are condensed in a first stage in an aqueous solution at atmospheric reflux and pH 8–10 for 1 to 5 hours. In a second stage, condensation is continued at pH 6–7 and atmospheric reflux at pH 6–7 for 2–6 hours. It is stated that this produces low-salt containing aqueous solutions of melamine formaldehyde condensation products having anionic sulfo groups. We do not know whether this process is effective but it is anyway unsatisfactory because long reaction times are apparently required and the product may therefore be expensive. From the figures provided in the patent, it also seems that the dry resin products still contain about 5% by weight of inorganic salt, and it would be advantageous to be able to reduce the amount even further.

SUMMARY OF THE INVENTION

Accordingly, an object of the present invention is to facilitate the production of water soluble sulfonated melamine-formaldehyde resins useful, in particular, as superplasticizers for concrete.

Another object of the invention is to enable water soluble resins that are effective as concrete superplasticizers to be produced less expensively and/or more quickly or easily than hitherto.

Yet another object of the invention is to provide a process of producing water soluble resins of the above type having relatively low contents of inorganic salts.

The present invention in one aspect provides a process of producing an aqueous solution of a sulfonated melamine-formaldehyde resin. The process comprises condensing melamine and formaldehyde or a precursor thereof in an aqueous mixture having a pH in the range of 8–10; reacting the resulting condensation product in an aqueous mixture having a pH of 8–9 with a sulfonating agent to produce a mixture containing a sulfonated condensation product; and polymerizing said sulfonated condensation product in an aqueous mixture having a pH of 5–7 to form a resin solution. During the process, either or both of the sulfonation step or the polymerizing step are carried out under superatmospheric pressure and at an elevated temperature. In the case of the sulfonating step, the temperature is within the range of 100–130° C. and the reaction is carried out for a time of 1 to 5 hours, preferably 1 to 3 hours. In the case of the polymerizing step, the temperature is within the range of 105–150° C. and the reaction is carried out for a time of 15 minutes to three hours, and preferably about one hour.

The resulting aqueous solution is generally cooled and its pH adjusted as required for its final use. If necessary, the solution may be dried to give a solid resin product.

In another aspect, the steps of the process indicated above may be modified so that sulfonation of the formaldehyde or precursor is carried out first, and then the sulfonated formaldehyde is reacted with the melamine. The reaction conditions are otherwise the same.

According to yet another aspect, the invention provides a further process of producing an aqueous solution of a sulfonated melamine-formaldehyde resin. In this process melamine, formaldehyde or a precursor thereof and a sulfonating agent are reacted in an aqueous mixture at a pH of about 8 under superatmospheric pressure at a temperature in the range of 100° to 130° C. for up to about 3 hours. The pH of the aqueous mixture is then adjusted to about 6 and the reaction is continued under superatmospheric pressure at a temperature in the range of 100° to 130° C. for a further period of up to about 3 hours.

The processes of the invention have the advantage that the sulfonation and/or polymerization steps carried out at elevated temperature and pressure at the indicated pH values result in the production of a resin of low salt content by a procedure of relatively short duration.

It has been found that the salt content of products of the processes may be as low as 1.5% by weight or less of the dry, solid resin. At these low levels, there is little adverse effect on the concrete into which the resins are introduced as superplasticizers.

It is also believed, that the products of the invention may contain a smaller proportion of low molecular weight polymers and may also contain a higher proportion of C—C bonds in the form of R—$CH_2$—R bonds connected to the formaldehyde moiety on the melamine, instead of the R—$CH_2$—O—$CH_2$—R bonds believed to be present in the conventional products.

Thus the products of the present invention are capable of imparting increased fluidity to concrete mixtures without adversely affecting the desirable physical properties of the concrete, when set.

DESCRIPTION OF THE PREFERRED EMBODIMENTS

Figure 1:
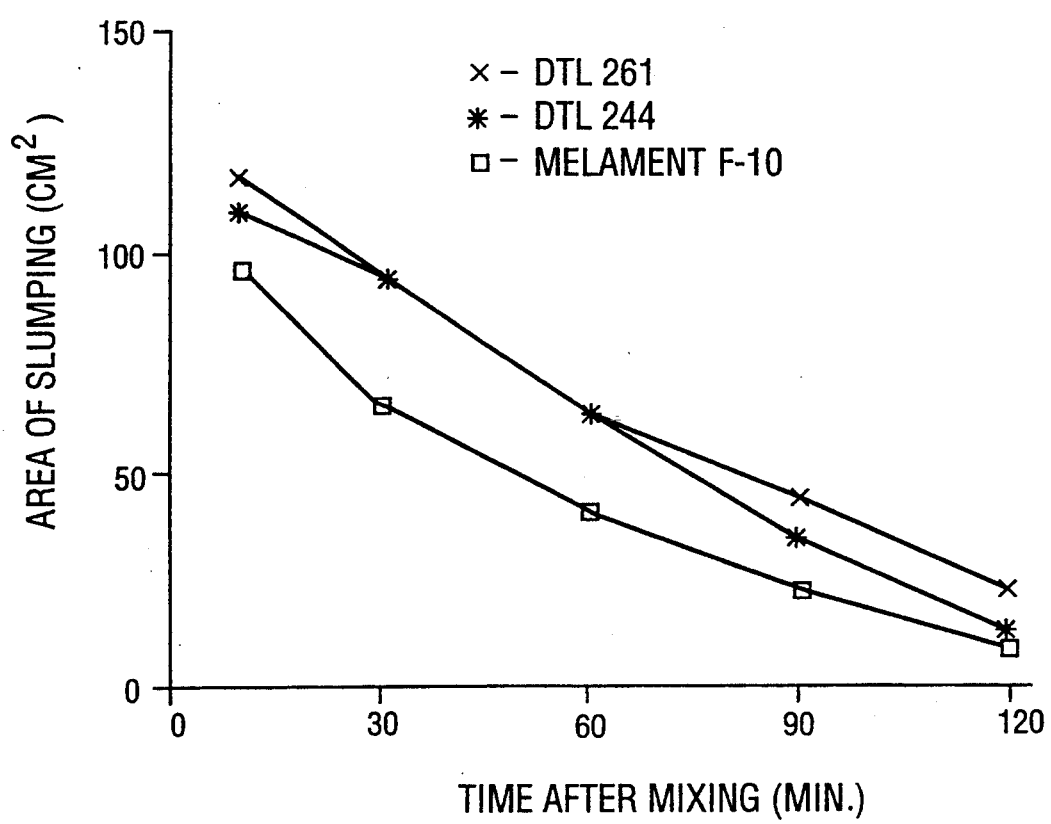
FIG. 1 is a graph showing slumping area versus time after mixing, for cement pastes containing various super-plasticizers, including a product produced according to the present invention.

The present invention relates to a process of producing water-soluble polymer solutions by reacting formaldehyde (or a precursor), melamine and a sulfonating agent, and makes use of mild pH values, superatmospheric pressures and elevated temperatures in one or more of the reaction stages to reduce reaction times and salt contents. It has been found that this is possible without adversely affecting the desired properties of the resulting resins as effective superplasticizers for concrete.

The superatmospheric pressures employed in the present invention are normally in the range of 5 to 70 psi, although superatmospheric pressures outside this range may be employed, if desired. The pressures are generally derived autogenously by carrying out the reactions in closed reaction vessels, but the elevated pressures may alternatively by produced by introducing inert gases under pressure into the reaction vessels, or by introducing a gaseous reactant under pressure, e.g. a gaseous sulfonating agent. However, in the latter case, steps to maintain the superatmospheric pressure must be carried out to compensate for consumption of the reactant during the process.

In general, the overall process requires the use of the following relative proportions of starting materials, namely 10–75 moles of water: 1 mole of melamine: 2.5 to 3.3 moles of formaldehyde or its precursor: 0.9 to 1.6 moles of sulfite, 0.45–0.8 moles of bisulfite or an equivalent amount of other sulfonating agent. The preferred relative proportions are 35–45 moles of water: 1 mole of melamine: 2.8–3.2 moles of formaldehyde or precursor: 1.10–1.35 moles of sulfite or 0.55–0.65 moles of bisulfite.

In a preferred form, the process of the present invention involves the following stages.

As a first step, melamine and formaldehyde (or a precursor, such as paraformaldehyde, which is converted to formaldehyde under the reaction conditions) are reacted by condensing one molecule of melamine with approximately three molecules of formaldehyde according to the following typical reaction scheme:

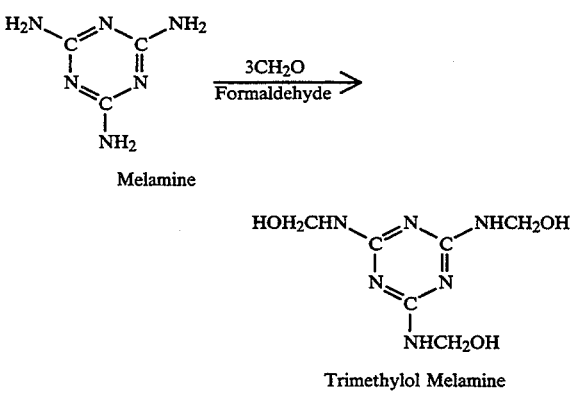

The reaction is carried out in aqueous mixture at a pH in the range of 8–10, preferably 8–9, at a temperature of between 40° to 100° C., preferably at about 60° C., for a short period, preferably about 30 minutes, normally under atmospheric pressure, although superatmospheric pressure could be used for this step, if desired. For example, water and formaldehyde may be placed in a reactor, the pH adjusted to the stated range by the addition of an appropriate amount of alkali, e.g. NaOH, the melamine added and the reactants heated to the stated temperature for the stated period or until the melamine has completely dissolved.

By carrying out the reaction under mild conditions for a short period of time preferably at atmospheric pressure, premature polymerization of the condensation product of melamine and formaldehyde product can be minimized. Although some polymerization may occur during this step, the extent is generally negligible. In contrast, when the condensation reaction is carried out at pH values higher than 10, the condensation proceeds readily, but when the condensation product is subsequently sulfonated, the polymerization reaction has already begun and the product contains an undesirably high concentration of intermediate molecular weight polymer material (i.e. material that has not reached its normal final molecular weight). These intermediate weight polymer products appear to be more difficult to polymerize into the desired long chain polymers in subsequent steps.

In a second step, the condensation product is sulfonated according to the following typical reaction scheme:

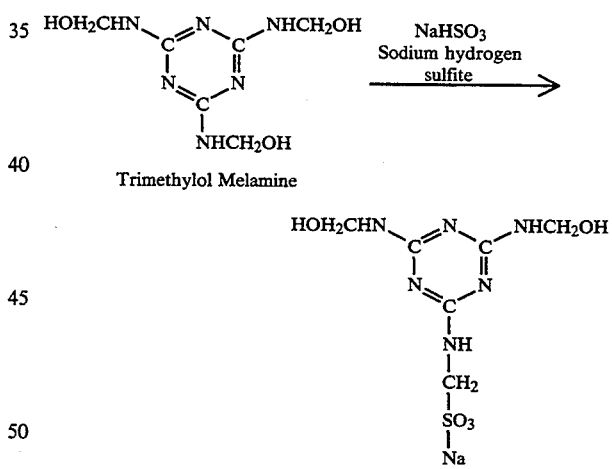

The sulfonating agent used for this reaction may be any conventional sulfonating reagent, e.g. sodium metabisulfite ($Na_2S_2O_5$) or the corresponding potassium salt, sodium sulfite ($Na_2SO_3$) or the corresponding potassium salt, sodium hydrogen sulfite ($NaHSO_3$) or the corresponding potassium salt, gaseous $SO_2$ or gaseous $SO_3$, although sodium metabisulfite is normally preferred for reasons of cost. The sulfonation reaction is normally carried out using the reaction mixture from the first step in the same reactor, provided the reactor is capable of being closed and operated under superatmospheric pressure. The pH of the mixture does not have to be adjusted by the addition of significant amounts of neutralizing acids or the like, which avoids the production of salts of neutralization at this stage, and is generally still in the range of pH 8–10, or preferably 8–9.

After the addition of the sulfonating agent, the reaction vessel is closed, and the reactants are heated preferably to 100° to 130° C. under superatmospheric autogenous pressure for a period of about ½ to 1 hour to complete the sulfonation, although longer times up to 3 hours are not harmful. At the end of this time, the contents of the reactor are cooled to below about 80° C. to facilitate the subsequent adjustment of the pH, as explained below.

Incidentally, if desired, the first and second steps referred to above may be reversed. That is to say, the sulfonation may first be carried out on the formaldehyde or its precursor, and then the sulfonated formaldehyde may be reacted with the melamine. In such a case, the conditions used for the sulfonation step and the melamine-formaldehyde reaction are essentially the same as those indicated above.

It may also be possible to carry out the condensation and sulfonation steps simultaneously.

While the use of superatmospheric pressure for the sulfonation step is preferred as stated above, the sulfonation may alternatively be carried out in a vessel open to the atmosphere, equipped with a suitable reflux condenser to retain the volatile products and/or reactants at atmospheric pressure. The temperature required for the sulfonation is then between 100 and 103° C. If atmospheric pressure is used for the sulfonation step in this way, then superatmospheric pressure must be used for the polymerization step, as described below.

In the third step, the sulfonated condensation product is polymerized in an aqueous mixture having a pH in the range of 5-7, preferably 6-7 and ideally about 7. This is normally achieved by adjusting the pH of the aqueous reaction product of the second step to the indicated range preferably in the same reactor by adding a small amount of an acid, e.g. sulphuric acid, and then heating the mixture at a temperature in the range of 105°-150° C., preferably about 130° C., for a short time of about 15 minutes to ½ hour under superatmospheric pressure, preferably in the range of 5 to 70 p.s.i., more preferably 30 to 40 p.s.i., usually generated autogenously by carrying out the reaction in the closed reactor. Longer reaction times up to 3 hours are not harmful. Alternatively, the pressure may be generated by adding an inert gas, as explained above.

It is alternatively possible to carry out this third reaction step at atmospheric pressure using a suitable reflux condenser or the like, but this is not preferred.

The resulting polymer is indicated by the typical formula below:

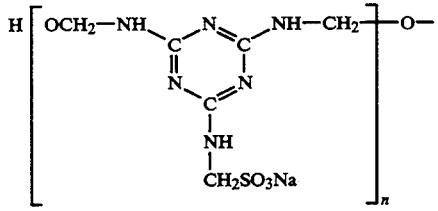

This third step of the process differs from the polymerization step of most conventional methods of producing sulfonated melamine-formaldehyde resins in that strongly acidic conditions are avoided and higher temperatures and preferably pressures are employed.

Although it has been observed that polymerization at higher pH values normally take much longer than those carried out in highly acidic conditions, we have found that the reaction times can be considerably reduced, without adversely affecting the desired characteristics of the polymer product, by increasing the reaction temperature to the indicated range and by carrying out the reaction under superatmospheric pressure.

As a further step, the reaction mixture is normally cooled and the pH is usually adjusted to a desired value (which depends on the intended application of the polymer product and is generally pH 7-9) by an addition of an appropriate amount of acid or alkali. Usually, NaOH is used to obtain the desired final pH.

The avoidance of highly acidic conditions for the polymerization step as used in many of the conventional processes results in a much smaller concentration of neutralization salts in the final polymer product. In fact, as indicated above, the content of such salts may be as low as 1.5% by weight or less.

While it is desirable to carry out both of the sulfonation and polymerization steps under superatmospheric pressure, as indicated above, the reaction may be carried out while employing superatmospheric pressure for only one of these steps, i.e. just the sulfonation step or just the polymerization step, the other step being carried out at atmospheric pressure in much the same way as the initial condensation step. While a reduction of the reaction time may thereby be achieved, the reduction is not likely to be as substantial as that achieved when both of these steps are carried out at superatmospheric pressure.

In a further alternative form of the invention, the reaction is not carried out in recognisable individual steps as indicated above, but instead all three reactants (formaldehyde or its precursor, melamine and the sulfonating agent) are reacted together in an aqueous solution having a pH of about 8 at a temperature in the range of 100 to 130° C. for up to about 3 hours. The pH is then adjusted to about 6 and the reaction is continued for up to a further 3 hours, again at a temperature in the range of 100° to 130° C. One or preferably both of these stages are carried out under superatmospheric pressure as indicated for the first process described above.

The products of the invention are aqueous solutions of water-soluble sulfonated melamine-formaldehyde polymers and they may be used in this form merely by appropriate concentration or dilution of the final reaction mixture, if desired. However, the polymer may be obtained as a solid by extraction from the reaction mixture, e.g. by spray drying to form a particulate solid or by evaporation of the aqueous medium, followed by grinding to form a powder. The solid polymer may be added as such to the concrete mix when the product is used as a superplasticizer for concrete or it may first be dissolved in a small amount of water to reconstitute the solution.

When the water soluble resins of the invention are used for this purpose, it is typical to add volume:volume about 4 parts of the resin (in the form of an aqueous solution having a concentration of about 35%) to 1000 parts of the concrete mix, at any time during the mixing of the ingredients. However, the optimum amount of the superplasticizer required will vary from case to case depending on such things as the type and origin of the cement, and other factors.

It should also be pointed out that the water-soluble resins and solutions produced according to the invention may also be suitable for other uses, e.g. as dispersants for dyestuffs and as tanning agents for leather.

The invention is illustrated in further detail by the following Examples which should not be view as limitative of the scope of the invention.

EXAMPLE 1

Process For Preparing Sample DTL 246:

In a reactor of the appropriate size, 700 parts by weight of water and 385 parts by weight of a 37% solution of formaldehyde were mixed together and the pH was adjusted to 8.8 by adding a 50% by weight solution of sodium hydroxide. Thereafter 200 parts by weight of melamine were added and the mixture was heated, under stirring, to 60° C. and kept at this temperature for 30 minutes. At the end of this time, the melamine had dissolved to give a clear solution.

Next, 176 parts by weight of sodium metabisulfite were added and the mixture was stirred until the salt had dissolved. The pH of the solution at this point was 8.1; if not, it was adjusted to pH 8.1 by the addition of sodium hydroxide.

The mixture was then transferred to a pressure vessel of appropriate capacity and the vessel was hermetically sealed. The contents were stirred mechanically, and heated to 100° C. and held therefor 3 hours. The pressure attained during the reaction period was 11 psi. At the end of the reaction, the mixture had a pH of 8.8.

The contents of the vessel were cooled, and the pH was adjusted to 6.0 by the addition of a 25% by weight solution of sulfuric acid. The vessel was then again closed hermetically, and heated to a temperature of 130° C., and held there for 1 hour. The pressure attained during this reaction period was 35 psi, and the pH of the mixture was 6.2.

The contents of the vessel were cooled, and the pH was adjusted to 7.1 by the addition of a dilute solution of sodium hydroxide.

| | |
|---|---|
| % solids | 33.5 |
| % formaldehyde | 0.08 |
| % sulfates | 0.5 |
| Viscosity | 22 centipoise |

EXAMPLE 2

Two products produced by the method of the invention were produced and identified as DTL-261 and DTL-244. DTL-261 was produced by polymerization at pH 7.0. DTL-244 was produced by polymerization at pH 6.0, at a formaldehyde to melamine ratio of 3.0:1, and under the conditions given in EXAMPLE 1.

These products were tested for efficacy as additives for concrete mixtures in comparison with conventional super-plasticizers, namely a conventional SKW sulfonated melamine-formaldehyde product sold under the trademark MELAMENT F-10.

The mini slumping test by D. L. Kantro, in Cement, Concrete and Aggregates, Winter 1980, Vol 2, #2, pages 96 to 102, was followed and the test results are shown in FIG. 1 of the accompanying drawings, which is a graph showing the area of slumping in cement paste treated with the various ingredients as a function of time elapsed since mixing. The concentration of dry superplasticizer used was, by weight, 0.5 parts per 100 parts of dry cement.

The results show that the DTL materials of the present invention give higher slumping areas than the SKW material and thus show better results than the reference SKW material when used as super-plasticizers for concrete.

EXAMPLES 3 TO 6

Process to Prepare Samples DTL 261, 283, 296, and 292:

These samples were made by the same sequence of steps described in Example 1, but the proportions, pH values and reaction times and temperatures were changed. Details of the process steps are given in the Table 1 below:

TABLE 1

| | EXAMPLE | | | |
|---|---|---|---|---|
| | 3 | 4 | 5 | 6 |
| | BATCH NO. | | | |
| | DTL 261 | DTL 283 | DTL 296 | DTL 292 |
| CONDENSATION REACTANTS | | | | |
| WATER PARTS | 700 | 700 | 450 | 700 |
| FORMALDEHYDE 37% PARTS | 367 | 476 | 367 | 367 |
| pH ADJUSTED TO | 8.5 | 8.6 | 8.6 | 8.8 |
| MELAMINE PARTS | 200 | 200 | 200 | 200 |
| HEAT TO °C. | 60 | 60 | 60 | 60 |
| HOLDING TIME MINS | 30 | 30 | 30 | 30 |
| SULFONATION REACTANTS | | | | |
| SODIUM METABISULFITE PARTS | 176 | 185 | 176 | 185 |
| HEAT TO °C. | 100 | 100 | 100 | 100 |
| pH ADJUSTED TO | 8.5 | 8.2 | 8.5 | 8.3 |
| MECHANICAL STIRRING | YES | YES | YES | YES |
| HOLDING TIME HRS | 3 | 3 | 3 | 3 |
| PRESSURE REACHED PSI | 12 | 12 | 11 | 12 |
| pH OF PRODUCT SOL'N | 8.8 | 8.3 | 8.6 | 8.3 |
| POLYMERIZATION AT SUPERATMOSPHERIC-PRESSURE | | | | |
| ADJUST pH TO | 7.0 | 6.5 | 6.5 | 6.5 |
| ADJUSTMENT WITH 25% H$_2$SO$_4$ | YES | YES | YES | YES |
| HEAT TO °C. | 130 | 130 | 130 | 130 |
| HOLDING TIME HRS | 1 | 3 | 1 | 1 |
| PRESSURE REACHED PSI | 33 | 36 | 35 | 33 |
| pH OF PRODUCT SOL'N | 7.1 | 6.5 | 7.0 | 6.8 |

TABLE 1-continued

| | EXAMPLE | | | |
|---|---|---|---|---|
| | 3 | 4 | 5 | 6 |
| | BATCH NO. | | | |
| | DTL 261 | DTL 283 | DTL 296 | DTL 292 |
| ADJUST pH TO | NIL | NIL | NIL | 7.2 |
| CHARACTERISTICS OF PRODUCT | | | | |
| % SOLIDS | 33.2 | 33.6 | 40.5 | 30.2 |
| % FORMALDEHYDE | 0.07 | 0.86 | 0.02 | 0.67 |
| % SULFATE | 0.2 | 0.5 | 0.4 | 0.3 |
| VISCOSITY CPS | 15 | >1000 | 153 | 14 |
| AS PLASTICIZER | | | | |
| BETTER THAN EXAMPLE 1 | ✓ | UNSATISFACTORY* | | |
| WORSE THAN EXAMPLE 2 | | | ✓ | ✓ |

*The unsatisfactory result was due to excessive viscosity. In this example, the formaldehyde to melamine ratio was 3.70; outside the preferred range of 2.8 to 3.2.

EXAMPLE 7

A comparison of the properties of products shown in U.S. Pat. No. 3,985,696 to Aignesburger and U.S. Pat. No. 4,444,945 to Sheldrick, with the properties of a commercial product (SKW-experimental results from commercial samples—process of production not known but presumed to be a process described in U.S. Pat. No. 3,661,829, 3,941,734 or 4,126,470 to SKW) and a product produced according to the present invention, has been made, as shown in Table 2 below:

TABLE 2

| Product/ Properties | U.S. Pat. No. 3,985,696 | U.S. Pat. No. 4,444,495 | SKW | Invention |
|---|---|---|---|---|
| % SO$_4$* in solution | 2.95 | 1.0 average** | — | 0.5 |
| % SO$_4$* in solid resin | 14.8 | 5.0** | 3.0 | 1.4 |
| % Na$_2$SO$_4$ in solid resin | 21.8 | 7.4 | 4.5 | 2.1 |

*The analytical procedure used to determine the concentration of sulfate in the product was to dissolve the sample (if not already in solution), take an aliquot portion and titrate it with a solution of lead to precipitate the sulfate as lead sulfate. The end point of the titration was determined by a colorimetric indicator which changed colour in the presence of free lead.
**The process disclosed in U.S. Pat. No. 4,444,945 produces a product containing on average 1% of sulfate in solution, which corresponds to 5% in the dry resin.

It can therefore be seen that the product of the invention contains smaller amounts of harmful salt than the other products shown in the table.

We claim:

1. A process of producing an aqueous solution of a sulfonated melamine-formaldehyde resin, comprising:
   condensing melamine and formaldehyde or a formaldehyde precursor in an aqueous mixture having a pH in the range of 8–10 to form a reaction mixture containing a condensation product of melamine and formaldehyde;
   reacting said condensation product in an aqueous mixture having a pH of 8–10 with a sulfonating agent to produce a mixture containing a sulfonated condensation product; and
   polymerizing said sulfonated condensation product in an aqueous mixture having a pH of 5–7 to form a resin solution;
   wherein at least one of said sulfonation step and said polymerizing step is carried out under superatmospheric pressure and at an elevated temperature of, respectively:
   in the case of the sulfonating step, 100°–130° C. for a time of 1 to 5 hours; and
   in the case of the polymerizing step, 105°–150° C. for a time of 15 minutes to three hours.

2. A process according to claim 1 wherein both of said sulfonating step and said polymerization step are carried out under superatmospheric pressure at said respective temperatures and times.

3. A process according to claim 1 wherein said condensing step is carried at a temperature of 40° to 100° C. for about 30 minutes.

4. A process according to claim 3 wherein said condensing step is carried out at about 60° C.

5. A process according to claim 1 wherein said condensing step is carried out under atmospheric pressure.

6. A process according to claim 1 wherein said sulfonating step is carried out under superatmospheric pressure for 1 to 3 hours.

7. A process according to claim 1 wherein said sulfonating step is carried out at a pH of 8–9.

8. A process according to claim 1 wherein said polymerization step is carried out at superatmospheric pressure for about 1 hour.

9. A process according to claim 1 wherein the polymerizing step is carried out at superatmospheric pressure for ¼ to ½ hour.

10. A process according to claim 1, wherein said superatmospheric pressures are in the range of 5 to 70 p.s.i.

11. A process according to claim 1, wherein said superatmospheric pressures are in the range of 30 to 40 p.s.i.

12. A process of producing an aqueous solution of a sulfonated melamine-formaldehyde resin, comprising:
   reacting formaldehyde or a precursor thereof with a sulfonating agent in an aqueous mixture having a pH of 8–10 to produce a mixture containing a sulfonated formaldehyde product;
   condensing melamine and said sulfonated formaldehyde product in an aqueous mixture having a pH in the range of 8–10 to form a reaction mixture containing a sulfonated condensation product of melamine and formaldehyde; and
   polymerizing said sulfonated condensation product in an aqueous mixture having a pH of 5–7 to form a resin solution;
   wherein at least one of said sulfonation step and said polymerizing step is carried out under superatmospheric pressure and at an elevated temperature of, respectively:

in the case of the sulfonating step, 100°–130° C. for a time of 1 to 5 hours; and in the case of the polymerizing step, 105°–150° C. for a time of 15 minutes to three hours.

13. A process of producing an aqueous solution of a sulfonated melamine-formaldehyde resin, comprising:

reacting melamine, formaldehyde or a precursor thereof and a sulfonating agent in an aqueous mixture at a pH of about 8 under superatmospheric pressure at a temperature in the range of 100 to 130° C. for up to about 3 hours; and then adjusting the pH of the aqueous mixture to about 6 and continuing the reaction under superatmospheric pressure at a temperature in the range of 100° to 130° C. for a further period of up to about 3 hours.

14. A process of producing a solid water soluble sulfonated melamine-formaldehyde resin useful as a superplasticizer for concrete, comprising producing a solution of a water soluble resin by a process according to claim 1, and separating said resin from said solution.

15. A process according to claim 14 wherein said resin is separated from said solution by a step selected from the group consisting of spray drying and evaporation followed by grinding.

* * * * *